Patented Nov. 23, 1948

2,454,315

UNITED STATES PATENT OFFICE 2,454,315

PROCESS FOR TREATING FISH PRESS WATER

James K. Gunther and Louis Sair, Decatur, Ind., assignors to Central Soya Company, Inc., Fort Wayne, Ind., a corporation of Indiana No Drawing. Application January 12, 1946, Serial No. 640,998

15 Claims. (Cl. 99—2)

This invention relates to a process or method for treating fish press water and the like.

Fish press water is a by-product of the fish processing industry. The body fluids are pressed from the fish and the resulting press water is condensed to varying extents, but usually to a point where it contains approximately 50% solid matter. Such press water contains valuable vitamins and supplements for feeds.

Since fish press water has to be shipped for considerable distances to points where it is to be incorporated in various feed products it is of great importance to increase the concentration as much as possible. An increase in concentration much beyond 50% has been found impracticable, however, because of the tendency of the concentrated material to gel, forming a tough gelatinous material which cannot be handled until the material is again made fluid by heating at higher temperatures.

Another problem confronting the industry is that of preserving the material against putrefaction or spoiling. The water has a fishy odor, is somewhat adhesive, and when stored at the usual commercial concentrations at temperatures of 70° F.–140° F. tends to become putrid. An increase in concentration greatly aids in preserving the material, but such increase in concentration has been prevented heretofore by the gelling characteristic of the material. In order to attempt to prevent spoiling, acid is usually added to bring the pH below 5.5. While such lowering of the pH at times is an aid in delaying putrefaction, it is by no means reliable inasmuch as decomposition frequently occurs at pH values of 5.5 and lower.

Another difficulty in the handling of fish press water or condensed fish solubles is caused by the viscosity and varying viscosities of the material. These viscosities make it difficult to properly meter the press water and to incorporate it uniformly with a feed material. Such viscosities are affected not only by the gel factor, but also by the presence of suspended solids and oil in the material.

An object of the present invention is to provide a method for greatly increasing the concentration of the material so that it may be shipped at much lower cost from the coastal areas to the points where it is to be incorporated in feeds. A further object is to provide a highly concentrated fish press water which does not require the low pH heretofore found necessary for preservation and which may be kept with a satisfactory degree of stability with a minimum of treatment for prolonged periods. A further object is to provide a process in which better metering and a more uniform distribution of the material is obtained through the removal of suspended solids and oil from the condensed fish solubles or press water. Yet another object is to provide a method for treatment of the material with a relatively minute amount of a proteolytic enzyme for the effective removal, for practical purposes, of the gel factor and viscosity reduction. Other specific objects and advantages will appear as the specification proceeds.

We have discovered that the gel factor, which has prevented the concentration of condensed fish solubles or fish press water to the degree desired with good fluidity at temperatures of 45°–100° F. can be effectively overcome by the use of a relatively small amount of a proteolytic enzyme. Any proteolytic enzyme may be employed for this purpose as long as the operation is within the operable pH range of the particular enzyme employed. Papain has been found to be particularly useful for effectively overcoming the gel characteristics of the press water for the temperature ranges usually encountered, and this enzyme is also desirable because it may be employed at a pH of 4.5–5.5.

We have also discovered that an important influence upon the viscosities of the material encountered in practice is the presence of suspended solids and oil in the material. Our process contemplates a method for the removal of such solids and oil so that a uniform distribution of the vitamin and protein supplement material can be obtained within the body of the material and its effective use in the incorporation with feeds carried out.

The new process may be employed either with fish press water, prior to concentration or after preliminary concentration, as such water is produced in fish processing plants on the coasts or it may be employed with the commercial concentrated material (containing usually about 50% solids) after it has arrived at feed-mixing plants. It is usually desirable to employ the process at the fish processing plants because of the substantial saving in freight costs effected through the shipment of highly concentrated material inland to the feed-mixing plants.

The proteolytic enzyme may be used with fish press water of widely varying solids content. It has been used with concentrated fish solubles and with fish press water having less than 18% solids. A relatively short treatment is sufficient, and concentration of the material may be begun after the papain or other enzyme has been stirred into the mixture for a matter of an hour or so and after the pH has been brought into the operable pH range of the enzyme selected.

We find that all proteolytic enzymes may be successfully used provided the pH is maintained in the operable pH range of the particular enzyme used, but some of the enzymes are found to be more effective than others. Since, however, so little of the enzyme is necessary to bring about the important new results, the efficiency of the particular enzyme is of minor importance, and the cost differential is not great. We prefer, however, to use papain not only because of its unusually high efficiency but because it operates well within the pH range of 4.5–5.5, a range that is desirable from the standpoint of requiring less change in the material as it is received.

The percentage of papain employed may be varied widely. Concentrations of papain varying from 0.1–0.01% have been used with good results as have also some concentrations of papain below 0.02%. A specific example of the use of papain may be set out as follows:

10.0 pounds of condensed fish solubles containing 18% solids (14.4% dissolved—3.6% suspended) were brought to a pH of 5.0 and the temperature was raised to 110° F. 0.01% of papain was added (0.082 gram to 815 grams of solids in the condensed fish solubles) and stirring was continued for 1.5 hours. The papain treated liquor was then concentrated "in vacuo" to 52% total solids. The viscosity of a sample was determined at 75° F., 60° F., and 45° F. and the evaporation was continued to 60% total solids. Again viscosities were determined and the solids were then raised to 70% by further evaporation. The relative viscosities are shown in the table.

*Table*

| Sample No. | | Viscosity in Centipoises | | |
|---|---|---|---|---|
| | | 75° F. | 60° F. | 45° F. |
| Control | Condensed fish solubles, no papain treatment (52% solids). | 760 | 1,810 | Solid |
| 2 | Condensed fish solubles, 0.01% papain treatment (52% solids). | 200 | 345 | 510 |
| 3 | Condensed fish solubles, 0.01% papain treatment (60% solids). | 390 | 770 | 1,085 |
| 4 | Condensed fish solubles, 0.01% papain treatment (70% solids). | 4,500 | 8,775 | 18,000 |

It can be seen that whereas the control sample (no papain treatment) was quite viscous at 60° F. and a solid at 45° F. the treated material was readily fluid at all temperatures including 45° F. Sample No. 3 which was concentrated to 60% solids was even more fluid over the temperature range than was the control.

In our preferred process, we first remove the suspended solubles and oil from the fish press water by any suitable method. This removal is accomplished satisfactorily by centrifuging, and we prefer to carry on centrifuging operations at a temperature from 170°–185° F. If the commercial concentrated product is being treated, it is important to first dilute the material to reduce the solids content from 50% to a much lower percentage, as, for example, to 20% solids. In this operation, we are able to remove from 80–90% of the suspended solids in the commercial condensed fish solubles product (dry substance basis). Besides removing the suspended solids, the centrifuging permits the recovery of from 5.1–7.7% of fish oil (D. S. basis). We prefer to carry on the centrifuging operation to an extent where less than 10% of the original suspended solids and oil remains in the material.

The product obtained by the above centrifuging operation may be concentrated to a higher degree than was possible prior to such centrifuging and the viscosity of the product is substantially less. In the removal of the solids, we are removing an "inactive material" in the sense that it does not contain to any substantial extent the desired vitamin or growth-promoting supplements. The removal of the solids further reduces the viscosity of the material, and thereby the gelling characteristics while, at the same time, preventing sedimentation during storage. Similarly, the removal of the oil definitely reduces viscosity while at the same time there is no substantial loss in the "active material" desired for promoting growth, etc. Further, the removal of the oil carries with it the cause of disagreeable odors which are undesired in the final product.

After the centrifuging operation which has removed most of the suspended solids and the oil, the pH is lowered to the operating pH range of the enzyme employed and the enzyme is stirred into the mixture to an extent to bring about its thorough incorporation in the mixture. A temperature is maintained suitable for the operation of the enzyme for a short period of time and then concentration may proceed until the material contains more than 74% solids.

The final product containing in excess of 74% solids is found to have much less tendency to decompose and can be stored for long periods of time without change.

The concentrated material remains highly fluid at low temperatures, and there is no need for heating apparatus to be employed at the various plants except in rare instances of very cold weather for raising the temperature of the product so that it may be handled in bulk as a fluid of regulated viscosity both during storage and upon application of the material to feeds.

While in the foregoing description we have set forth specific samples and specific details of procedure, it will be understood that such details may be modified widely by those skilled in the art without departing from the spirit of our invention.

We claim:

1. In a process for treating fish press water, the steps of subjecting the press water to the action of a proteolytic enzyme under conditions favorable to the action of the enzyme, to reduce the gel point of the press water, and concentrating the press water.

2. In a process for treating fish press water, the steps of subjecting the press water to the action of a proteolytic enzyme under conditions favorable to the action of the enzyme, to reduce the gel point of the press water, and concentrating the press water until it contains in excess of 70% solids.

3. In a process for treating fish press water, the steps of subjecting the press water to the action of papain under conditions favorable to the action of this enzyme, to reduce the gel point of the press water, and concentrating the press water.

4. In a process for treating fish press water, the steps of subjecting the press water to the action of from .005–.1% of papain under conditions favorable to the action of this enzyme, to reduce the gel point of the press water, and concentrating the press water.

5. In a process for treating fish press water concentrated to about 50% solids, the steps of subjecting the fish press water to the action of a proteolytic enzyme under conditions favorable to the action of the enzyme to reduce the gel point of the press water, and concentrating the press water until it contains in excess of 50% solids.

6. In a process for treating fish press water concentrated to about 50% solids, the steps of removing the suspended solids from the press water, then subjecting the press water to the action of a proteolytic enzyme under conditions favorable to the action of the enzyme to reduce the gel point of the press water, and concentrating the press water until it contains substantially more than 50% solids.

7. In a process for treating fish press water concentrated to about 50% solids, the steps of subjecting the press water to the action of papain under conditions favorable to the action of this enzyme to reduce the gel point of the press water, and concentrating the press water until it contains substantially in excess of 50% solids.

8. In a process for treating fish press water, the steps of centrifuging the press water to remove suspended solids and oil therefrom, and then subjecting the press water to the action of a proteolytic enzyme under conditions favorable to the action of the enzyme to reduce the gel point of the press water, and concentrating the press water.

9. In a process for treating fish press water, the steps of centrifuging the press water within a temperature range of about 170–185° F. to remove suspended solids and oil therefrom, then subjecting the press water to the action of a proteolytic enzyme under conditions favorable to the action of the enzyme to reduce the gel point of the press water, and concentrating the press water.

10. In a process for treating fish press water, the steps of centrifuging the press water within a temperature range of about 170–185° F. to remove suspended solids and oil therefrom, then subjecting the press water to the action of a proteolytic enzyme under conditions favorable to the action of the enzyme to reduce the gel point of the press water, and concentrating the press water until it contains in excess of 70% solids.

11. In a process for treating fish press water, the steps of centrifuging the press water to remove suspended solids and oil therefrom, then subjecting the press water to the action of papain under conditions favorable to the action of this enzyme to reduce the gel point of the press water, and concentrating the press water.

12. In a process for treating fish press water, the steps of centrifuging the press water with the solids content of not above 20% to remove suspended solids and oil therefrom, then subjecting the press water to the action of a proteolytic enzyme under conditions favorable to the action of the enzyme to reduce the gel point of the press water, and concentrating the press water.

13. In a process for treating fish press water concentrated to about 50% solids, the steps of diluting the press water, centrifuging the press water to remove suspended solids and oil, then subjecting the press water to the action of a proteolytic enzyme under conditions favorable to the action of the enzyme to reduce the gel point of the press water, and concentrating the press water.

14. In a process for treating fish press water concentrated to about 50% solids, the steps of diluting the press water to approximately 20% solids, centrifuging the press water to remove suspended solids and oil, then subjecting the press water to the action of a proteolytic enzyme under conditions favorable to the action of the enzyme to reduce the gel point of the press water, and concentrating the press water.

15. In a process for treating fish press water in which the fish press water is concentrated, the step of subjecting the press water to the action of a proteolytic enzyme under conditions favorable to the action of the enzyme to reduce the gel point of the press water.

JAMES K. GUNTHER.
LOUIS SAIR.

REFERENCES CITED

The following references are of record in the file of this patent:

UNITED STATES PATENTS

| Number | Name | Date |
| --- | --- | --- |
| 1,516,952 | Brune | Nov. 15, 1924 |
| 1,991,242 | Cole et al. | Feb. 12, 1935 |
| 2,403,174 | Ernst | July 2, 1946 |

FOREIGN PATENTS

| Number | Country | Date |
| --- | --- | --- |
| 555 | Great Britain | 1882 |
| 537,423 | Great Britain | 1941 |